Patented Feb. 15, 1927.

1,618,105

UNITED STATES PATENT OFFICE.

HARALD PEDERSEN, OF TRONDHJEM, NORWAY, ASSIGNOR TO ALUMINUM COMPANY OF AMERICA, OF PITTSBURGH, PENNSYLVANIA.

PROCESS OF MANUFACTURING ALUMINUM HYDROXIDE.

No Drawing. Application filed June 7, 1926, Serial No. 114,278, and in Norway May 23, 1925.

It has heretofore been proposed to produce slags or fluxed compositions containing compounds of calcium and aluminum (calcium aluminates) and to recover the alumina therefrom by extracting the pulverized slag with aqueous solutions of sodium carbonate or sodium hydroxide. If sodium carbonate is employed, the aluminum hydroxide is recovered and the solution regenerated by treatment with carbon dioxide, which converts the sodium aluminate to sodium carbonate and aluminum hydroxide. If sodium hydroxide is used, the alumina is precipitated by the well-known Bayer process, in which the sodium aluminate solution is hydrolyzed and aluminum hydroxide precipitated by gradual cooling and agitation in the presence of previously precipitated aluminum hydroxide. The resulting solution, the solute of which consists largely of sodium hydroxide containing some sodium aluminate, is employed for leaching a new lot of the slag. It has also been proposed to first precipitate part of the alumina by the Bayer process, and then precipitate the rest by the carbonation process, using the resulting carbonate solution to leach the next log of slag.

In practically carrying out such a process, I have found that in employing the sodium carbonate solution for the leaching process, considerable proportions of silica are dissolved with the alumina, unless the solution is very dilute (3% or less) and unless an excess of slag is used. In regenerating this solution by precipitating the alumina with carbon dioxide, all (or practically all) of the silica which was dissolved is precipitated together with the alumina, thus contaminating the latter and rendering it less valuable for the preparation of aluminum. Moreover, the aluminum hydroxide thus produced is so finely divided that the resulting alumina is an impalpable powder and an unduly large amount of it is lost as dust in the calcination plant and in charging it into the electric furnace in which it is electrolyzed to produce the metal.

On the other hand, if sodium hydroxide, (which may or may not contain alumina from previous use in the process) is used to dissolve alumina from the slag, the rate of reaction is much slower, and the percentage of the total alumina which is extracted from the slag can not be so high as when sodium carbonate is used, as the calcium hydroxide formed in such a large amount (from the calcium compounds in the slag) reacts with the dissolved alumina. The ratio of alumina to soda in the resulting solution is lower and that of silica to alumina is considerably higher than when sodium carbonate is used. The aluminum hydroxide produced by the autoprecipitation of such a solution according to the Bayer process is satisfactorily granular in character, but contains so much silica as to be of low value for aluminum production. More or less of this dissolved silica can be removed from the solution before the aluminum hydroxide is precipitated, by the use of known processes, but such a removal involves extra expenses and loss of some alumina, and is only partial at best.

I have now found by experiment that if the pulverized slag is extracted with a hot sodium carbonate solution containing a small proportion of free sodium hydroxide, the presence of this small amount of caustic alkali does not seriously retard the solution of the alumina or reduce the ratio of alumina to soda in the solution, but does tend to prevent the solution of the silica. By the term "free sodium hydroxide" here is meant that amount which is present in excess of the amount required to form sodium aluminate, $NaAlO_2$, with the alumina present in the solution. If a larger proportion of free caustic alkali is used, the rate of solution of the alumina and the ratio of alumina to soda in the solution are decreased, while the ratio of silica to alumina increases. The best results have been obtained when the amount of free caustic alkali is kept very low, and when such a solution is used for leaching the slag, it has been found that the amount of silica dissolved is considerably smaller than when sodium carbonate or sodium hydroxide solution is used alone.

I have also found that the content of silica in the solution increases with the concentration of total alkali. With a 3 or 4 percent solution it has been found that the silica is still under 0,1%, calculated on the alumina in the solution, and these solutions may be directly precipitated with carbon dioxide. But on account of the low concentration and the finely divided aluminum hydroxide thus precipitated, it is desirable to go to higher contents of alkali in the solution, and use autoprecipitation, as in the Bayer process. The strength of the solution used for leaching should preferably be between 3 and 8% (30-80 grams per liter) the total alkali being figured as $Na_2CO_3$.

It has been found that if the solution of caustic soda and sodium aluminate remaining after the Bayer precipitation be heated nearly to the boiling point, it may be treated with carbon dioxide until the amount of free caustic soda is reduced to about 10% or less of the total soda present, without precipitating any of the alumina from the solution. Such a solution is then ready for use in leaching a fresh portion of pulverized slag, and may contain as much as about 8-9% by weight of the total soda (calculated as $Na_2CO_3$) without dissolving silica equivalent to more than 0,4% of the total weight of alumina in solution, and the weight ratio of alumina to caustic soda after leaching and filtering may be as high as 1.2, so that about two thirds of the alumina in solution may be recovered in the subsequent autoprecipitation. Because the caustic soda is not neutralized in this precipitation, most of the dissolved silica is found to be retained in solution during the precipitation, and the resulting aluminum hydroxide may contain silica to the extent of less than 0,1% by weight of its $Al_2O_3$ contents.

Another method of carrying out my present invention, consists in leaching the calcium aluminate with a 3 to 4 percent solution of sodium carbonate containing a small proportion of free sodium hydroxide, with or without small amount of sodium aluminate, as above described, and then submitting this solution after filtration to a precipitation process which is a combination of autoprecipitation and recarbonation. For this purpose a suitable amount of precipitated aluminum hydroxide is mixed with the above mentioned solution obtained by leaching of the calcium aluminate, at a relatively high temperature say about 80° C., and maintained in suspension in said solution by stirring or other means as is customary in the autoprecipitation process. In order to accellerate this process, however, carbon dioxide is gradually introduced into the solution so as to partially but not completely neutralize the total amount of caustic soda present. By continually tending to reduce the amounts of free caustic soda, this introduction of carbon dioxide accelerates the autoprecipitation and enables the recovering of the greater part of the alumina in the solution in a much shorter time than would be otherwise required, and at the same time, after filtering, a sodium carbonate solution is obtained containing a small amount of free caustic soda and some sodium aluminate which is adapted to be used again in leaching calcium aluminate.

Thus by the use of the present process it is possible to obtain from the calcium aluminate slags and similar materials a better aluminum hydroxide than with the previously known processes of treating such materials, at a lower cost. While sodium carbonate and sodium hydroxide are preferred for use in the process on account of their lower cost, other soluble carbonates and hydroxides, such as those of potassium, could be used in the same way. The terms "alkali metal hydroxide" and "alkali metal carbonate" will hereinafter be employed to include both the sodium and potassium compounds.

I claim:

1. A process for producing aluminum hydroxide low in silica from slags and similar materials containing compounds of lime and alumina, comprising the step of leaching the material with a solution containing chiefly an alkali metal carbonate and containing also a small amount of free alkali metal hydroxide.

2. A cyclic process of producing granular aluminum hydroxide which comprises leaching fluxed aluminous material with alkali metal carbonate solution containing some caustic alkali, followed by autoprecipitation of hydrated alumina and recovery of part of the alumina content of the resulting solution, and reconverting most but not all of the free caustic alkali in the resulting solution into carbonate, and again employing the remaining solution to leach a further portion of said fluxed aluminous material.

3. A process according to claim 1 in which the amount of free caustic alkali is about 10% of the amount of total alkali, calculated as carbonate.

4. A process of producing aluminum hydroxide low in silica from slags or similar fluxed materials containing compounds of alumina and alkaline materials, by leaching the same with a solution containing alkali metal carbonate and a much smaller amount of free caustic alkali, the total alkalinity of such solution, figured as carbonate, being between about 3% and about 8%.

In testimony whereof I have signed my name to this specification.

HARALD PEDERSEN.